US009428052B1

(12) United States Patent
Raz

(10) Patent No.: US 9,428,052 B1
(45) Date of Patent: Aug. 30, 2016

(54) AUTOMATED DISTRACTION MEASUREMENT OF MACHINE OPERATOR

(71) Applicant: Ofer Nissim Raz, El Cerrito, CA (US)

(72) Inventor: Ofer Nissim Raz, El Cerrito, CA (US)

(73) Assignee: Towers Watson Software Limited, London (GB)

( * ) Notice: Subject to any disclaimer, the term of this patent is extended or adjusted under 35 U.S.C. 154(b) by 95 days.

(21) Appl. No.: 14/020,056

(22) Filed: Sep. 6, 2013

Related U.S. Application Data

(60) Provisional application No. 61/698,596, filed on Sep. 8, 2012.

(51) Int. Cl.
*B60Q 1/00* (2006.01)
*B60K 28/02* (2006.01)

(52) U.S. Cl.
CPC .................................... *B60K 28/02* (2013.01)

(58) Field of Classification Search
CPC .... G07C 5/008; G07C 5/0816; G07C 5/085; G07C 5/0808; G06Q 40/08; G06Q 10/10; G06Q 30/00; G06Q 30/0201; G09B 19/167; G09B 5/00; G09B 9/042; G09B 9/052; B60K 2350/1092; B60K 28/066
USPC ...... 340/575, 439, 576, 573.1, 573.3, 568.1, 340/555, 545.3, 541, 539.31, 539.21, 340/539.22
See application file for complete search history.

(56) References Cited

U.S. PATENT DOCUMENTS

| | | | | |
|---|---|---|---|---|
| 2009/0036156 | A1* | 2/2009 | Rapisarda | H04M 1/22 455/556.1 |
| 2009/0284361 | A1* | 11/2009 | Boddie et al. | 340/439 |
| 2009/0298482 | A1* | 12/2009 | Yen | H04M 1/6075 455/414.2 |
| 2010/0131304 | A1* | 5/2010 | Collopy et al. | 705/4 |
| 2010/0254019 | A1* | 10/2010 | Cui et al. | 359/633 |
| 2011/0009107 | A1* | 1/2011 | Guba | G08G 1/20 455/418 |
| 2011/0090075 | A1* | 4/2011 | Armitage et al. | 340/439 |
| 2011/0294520 | A1* | 12/2011 | Zhou et al. | 455/456.1 |
| 2012/0109692 | A1* | 5/2012 | Collins | G06Q 30/00 705/4 |
| 2012/0122525 | A1* | 5/2012 | Miller | H04M 1/6091 455/569.2 |
| 2013/0084847 | A1* | 4/2013 | Tibbitts et al. | 455/419 |
| 2013/0178234 | A1* | 7/2013 | Jones et al. | 455/456.4 |
| 2013/0297599 | A1* | 11/2013 | Henshall | G11B 27/105 707/736 |
| 2014/0139655 | A1* | 5/2014 | Mimar | 348/77 |

* cited by examiner

*Primary Examiner* — Daniel Previl
(74) *Attorney, Agent, or Firm* — King & Spalding

(57) ABSTRACT

A system and method for automated monitoring/evaluating of the distraction of an operator of a controllably movable object, and more specifically, but not exclusively, to a system for monitoring and/or evaluating distraction of a driver of a vehicle and providing a score to the level of distraction relating to the use of other device while driving.

18 Claims, 3 Drawing Sheets

30
31
32
33
34
Weight
Average event distraction level
DL x 0.8
$\sqrt{d^2 + m^2 + h^2}$
= Distraction Level
1.3
Rate of Distraction events per mile
1
0
3 e/m
0.35 x 0.5
Percentage of Distraction time per driving session
DL/100 x 0.9

10
11
12
13
14
Speed (m/s)
Acceleration (G-Force)
Yaw rate (rad/s)
1
0
36 m/s
0.5 g
0.2 rad/s
0.9
0.35
0.6
Weight
x 0.8
x 0.5
x 0.9
$\sqrt{\dfrac{a^2 + g^2 + y^2}{1.3}}$
= Driving Difficulty 30
31
32
33
34
Weight
Average event distraction level
DL x 0.8
Rate of Distraction events per mile
1
0
3 e/m
0.35 x 0.5
Percentage of Distraction time per driving session
DL/100 x 0.9
$\sqrt{\frac{d^2 + m^2 + h^2}{1.3}}$ = Distraction Level 40
Application start
Collect driving data
41
Did application enter into background mode?
Yes
No
42
Calculate Driving diffculty
Log Distraction start time and difficulty
Smart phone is switching to other task
43
Application enters in to foreground
Log distraction end time
Driving session ended ?
No
Yes
44
Calculate session distraction score
Application start

AUTOMATED DISTRACTION MEASUREMENT OF MACHINE OPERATOR

CROSS REFERENCE TO RELATED APPLICATIONS

This application claims benefit of U.S. Patent No. 61/698,596 filed 8 Sep. 2012, the contents of which are hereby expressly incorporated by reference thereto for all purposes.

FIELD OF THE INVENTION

The present invention relates generally to automated monitoring/evaluating of the distraction of an operator of a controllably movable object, and more specifically, but not exclusively, to a system for monitoring and/or evaluating distraction of a driver of a vehicle and providing a score to the level of distraction relating to the use of other device while driving.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Recent statistics, published by the AAA Foundation for Traffic Safety clearly show that distracted driving is a problem that needs to be solved and fast.

Distraction.gov site points out that 20 percent of injury crashes in 2009 involved reports of distracted driving. According to the 2010 Traffic Safety Culture Index, 52% of drivers say driving feels less safe today than it did 5 years ago. Nearly half cite some form of driver distraction as the main reason or as a reason for their feeling less safe.

From 2001 to 2007, more than 16,000 deaths in traffic crashes can be attributed to texting. Annual cell phone-related crash fatalities rose by 28% between 2005 and 2008. Researchers are pointed out that this dramatic increase corresponds to the time when texting gained massive popularity. So while cell phone use in general remained relatively consistent, people were increasingly taking their eyes off the wheel to look down and type.

While state sponsored legislations have been instituted against use of cell-phones while driving, studies show that these are not driving any significant reduction in distracted driving. Besides laws against texting while driving have proven difficult to enforce. Legislation may create penalties, but drivers create change.

With the rise of smart cell phones, several applications geared towards distraction-free driving are available in the market today; all take the approach of blocking the use of features of the smart phone as cellular phone, texting or emailing while driving. The more sophisticated applications are also proactively taking actions on behalf of the driver by handling incoming calls or SMS messages. Typically a message is sent to the caller informing them about the user as driving currently.

What is needed is a system and method for automatically evaluating difficulty/distraction of a machine operation during operation of that machine by the operator.

BRIEF SUMMARY OF THE INVENTION

Disclosed is a system and method for automatically monitoring/evaluating, the distraction of an operator of a controllably movable object.

The following summary of the invention is provided to facilitate an understanding of some of technical features related to automated distraction metrics and use thereof, and is not intended to be a full description of the present invention. A full appreciation of the various aspects of the invention can be gained by taking the entire specification, claims, drawings, and abstract as a whole. The present invention is applicable to other machines and uses of the scoring/triggering system.

It is believed that the right approach to reducing driving distraction is motivating drivers to change their behavior and not by blocking their communication, but some embodiments may be designed to automatically selectively block based upon triggering information from difficulty/distraction parameters automatically evaluated. In some embodiments, this evaluation is automatically performed in real-time by the device or other automated computing system.

In order to change driving behavior you should first be able to measure the behavior and create an index or score as a reference for change or improvement. This invention suggests methods and algorithms for measuring the distraction of a motor vehicle operator.

In one embodiment, the present invention is automatically calculating and logging the operator distraction based on monitoring the status of a device used by the operator, the device including a computing system having a processing unit and a memory storing program instructions, the instructions causing the processor to implement one or more of the processes described herein. Such a device can be:

- Cellular phone
- Smart phone
- Navigation device
- Workforce management device
- Communication device
- Telematics device
- Any device that require interaction with the operator In a further embodiment, the present invention provides an automated method for evaluating the distraction of an operator based on monitoring changes in the status of the device used by the operator. The method can collect one or more of the information below:

- Switching between applications the operator is using on the device
- Interaction with the device by pressing keys
- Interaction with the device using a touch screen
- Listening to audio generated by the device
- Interacting with the device by voice activation
- Interaction with the device by monitoring the operator brain signals In another embodiment, the present invention provides a method for automatically evaluating the distraction of an operator based on also monitoring switching between applications and is based on collection of one or more of the below:

- What application the operator was switching to
- How much time in total has the operator spent on each application, counting all occurrences of the application being invoked
- How much time has the operator spent on each application on a single occurrence
- How many times has the operator switched to a particular application How many times or how frequently does the operator switch to a particular application How familiar the operator was with the application being switched to, or in other words: is the operator going to be in the learning curve of a new application In another embodiment, the present invention provides a method for automatically evaluating the distraction of an operator based on also monitoring the interaction of the operator with the device by collecting one or more of the following information:

How often has the operator pressed keys on the device

What is the duration between each key-press

Is the duration between individual key-press changing

Is there a pattern in the way keys are being pressed

Is the operator typing using real or touch-screen keyboard

Is the device using audio to communicate with the driver

How often the device is using audio feedback

How long does each audio feedback is on

Does the operator respond to the audio feedback with key-press

Does the operator respond to the audio feedback with voice commands

In another embodiment, the present invention provides a method for automatically evaluating the distraction of an operator using a device with limited abilities to monitor the device status, by monitoring the operation of the monitoring method. Devices such as Apple iOS based ones have limited ability to measure events that are not related to the application that is currently executing. Distraction evaluation on such devices will be done by monitoring the interference to the monitoring method by the operation system or other applications. For example, in Apple iOS, the running application will get an event, notifying it of an impending switch to cause it go to background. Such an event can be the result of:

The user is getting a phone call

The user is getting an SMS message

The user was pressing the home or menu button

The user is switching to a different application

In such a case the application or monitoring method can log the time of the switching from and back to the application. The log can then be used to evaluate the operator distraction.

In another embodiment, the present invention provides an automated method for evaluating the distraction of an operator by processing the data that was collected by the monitoring method. Processing the data can be done in one or more of the following ways:

In real-time—As new data is collected the score is re-calculated. Here in the system has an updated score at all times.

At periodic intervals—Data is collected and logged and new score is calculated at given intervals.

On demand—Data is collected and new score is calculated on a need basis.

Offline—Data is collected and logged but score is calculated at a future time after the driving session is over.

In further embodiment, the present invention provides an automated method for calculating a score or index of the distraction to an operator based on the collected data. Calculating the score can be done using one or more of the following methods:

Each data type collected can be measured, normalized and scored by the distribution of the type compared to other drivers. This distribution across multiple data types can be integrated in to one score by applying different weight to each type.

Each type can be measured as rate. For e.g. how frequent is the occurrence of the data type during one hour of driving or 100 miles.

The data can be combined using a fitting function created by a machine-learning algorithm. In this case the learning set to the machine-learning algorithm will be a set of types collected and a human observation of the expected results. The machine-learning algorithm will find the correlation function between the input set and the expected results. This function will then be used to evaluate new data. Several techniques can be employed for this purpose:

Using a fuzzy-logic algorithm to estimate the distraction score based on a set of inputs.

Using typical signal analyzing systems employing signal processing techniques such as Fourier transform, neural networks, artificial intelligence, pattern matching, spread sheet program, database and means, spectral analysis, and statistical and scenario modeling Using any other mathematical or statistical method to evaluate a score based on the collected data.

In another embodiment, the present invention provides a method for evaluating the distraction of an operator during a vehicle driving session by using the following algorithm:

Measure set of parameters during the driving session. The parameters include:

Duration of the driving session

Mileage driven during the session

Number of distraction events during the driving session.

The driving difficulty for each distraction event that occurred.

The total time driver spent on distractions.

Normalize a subset of parameters calculated to have a value ranging from 0 to 1. This subset of parameters includes:

Average events distraction level (DL). This parameter is calculated by averaging the driving difficulty for all the distraction events. As the driving difficulty is based on one or more parameters associated or related to measured, calculated, or otherwise determined parameters (e.g., info from the device or a telematics unit associated with the controllable machine, such as speed and acceleration) and has a value between 0 and 1. The average will also have this range.

Distraction events per mile (DM). The total number of distraction events divided by the total driven miles. This rate will be normalizing based on the distribution in the population using a sigmoidal function.

Distraction duration per driving time (DH). Total of distraction time divided by total driving time. This rate will be normalizing based on the distribution in the population using a sigmoidal function.

These subset parameters will then be fuzzified using fuzzy-logic techniques to answer basic antecedent questions to result with a number between 0 and 1:

Is DL extremely high?

Is DM high?

Is DH high?

Each of the fuzzified questions is associated with a membership function that result in an antecedent answer. In the next step we apply a weight to each antecedent answer. The weights used here are: 0.7 for DL, 0.9 for DM and 0.4 for DH.

The last step in the algorithm is to de-fuzzify the results and get a single number between 0 and 1 that indicate the level of distraction within driving session. This is done by the function:

Session driving distraction=SQRT((0.7*DL)+(0.9*DM)+(0.4*DH))

The result is a number between 0 and 1 where at zero there is no distraction and in one the distraction is high. The result is advantageously used in many different contexts, such as a scaling value or a trigger for various other evaluative, monitoring, or safety processes (e.g., as the difficulty and/or distraction value exceeds various thresholds, various signaling and control processes may be implemented to inform or mitigate the difficulty and/or distraction. In some systems, operational parameters of the controllable machine may be limited the higher the distraction (e.g., top speed is reduced or music system disabled). As noted, some implementations may prefer to enable benefits when the distraction is lower, which may include enhancing operational profiles and/or enabling optional systems (e.g., music). For example, each mile may be automatically assigned a metric value that is influenced by the distraction and/or difficulty. The metric value is associated with a reward system that offers the driver better incentives for lower distraction/lower difficulty driving. For example, each mile driven may be worth 100 points max, but a driver with a distraction rating of 50% earns 50 points of the possible 100 points for those miles with such a rating. The system and method automatically determines and logs the appropriate reward points. A fleet operator may use the system to reward good drivers by sharing savings in insurance or other costs that are realized by monitoring and encouraging lower risk driving (and/or discouraging higher risk driving).

Any of the embodiments described herein may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION OF THE INVENTION

Embodiments of the present invention provide a system and method for automated monitoring/evaluating of the distraction of an operator of a controllably movable object, and more specifically, but not exclusively, to a system for monitoring and/or evaluating distraction of a driver of a vehicle and providing a score to the level of distraction relating to the use of other device while driving. The following description is presented to enable one of ordinary skill in the art to make and use the invention and is provided in the context of a patent application and its requirements.

Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
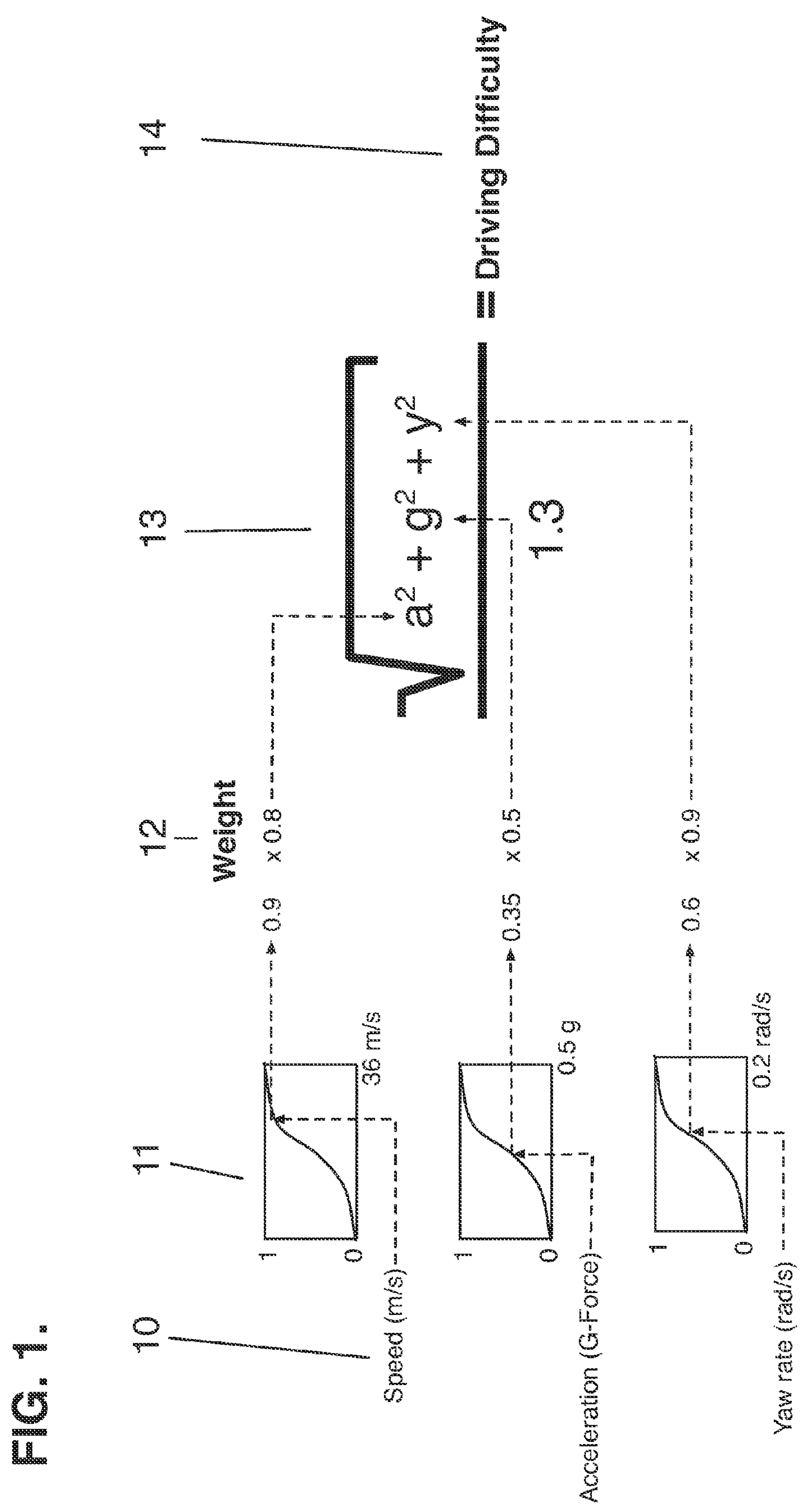
FIG. 1. illustrates a flow diagram, showing the steps for calculating driving difficulty.

Referring initially to FIG. 1, an algorithm for calculating the real-time driving difficulty while driving is shown. This parameter is used in order to classify the severity of each driving distraction event. Whenever a driving distraction event occurs, the driving difficulty is calculated and the time and calculated score is logged for later use. 10 describe the parameters that are used as input to the algorithm. These parameters include:

- Speed, as measured by the GPS resident in the Smartphone. Is measured in meters per second units
- Acceleration, as measured by the accelerometer resident in the Smartphone. Is measured in G-Force units
- Yaw rate, as measured by the Gyroscope resident in the Smartphone. Is measured in radians per second units At 11, the three parameters are normalized to be between 0 and 1 using a Sigmoidal function.

At 12 each of the normalized parameters is multiple by a weight, that indicates how significant this parameter is in the overall result.

At 13 the size of a normal is calculated based on the normalized parameters as vectors. The result is divided by the maximum size of the vector, in order to keep the result between 0 and 1.

14 is the result, which indicates the deriving difficulty at a given time.

Figure 2:
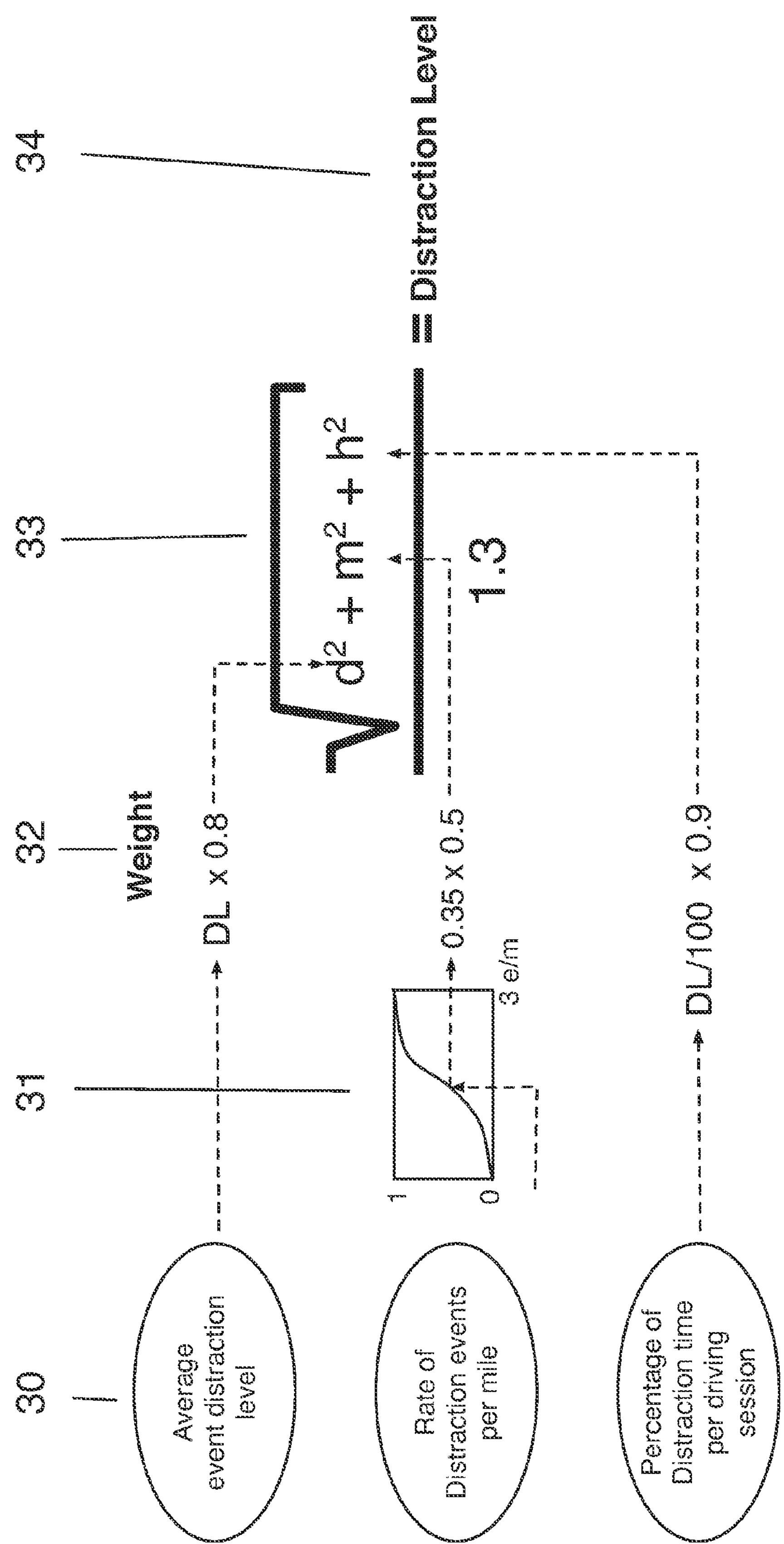
FIG. 2. Illustrates a flow diagram, showing the steps for calculating driving session distraction level.

FIG. 2. Shows an algorithm for calculating the distraction level score assigned to an entire driving session. 30 shows the parameters used as inputs to the algorithm. These parameters are:

- Average event distraction level is the average driving difficulty during distraction events. This parameter is recorded every time a distraction event occurs. At the end of the driving session, the sum of the driving difficulty of all the distraction events is divided by the number of distraction events occurring during the driving session.
- Rate of distraction events per mile. The number of distraction events, during the driving session, is divided by the distance traveled during the session.
- Percentage of distraction time per driving session. At the start of every distraction event, a time stamp is recorded. When the distraction is over, the distraction duration is recorded. This parameter is the sum of the total distraction time divided by the driving session time.

At 31 parameters are normalized to be a value between 0 and 1. The “Average event distraction”, is already between 0 and 1 and does not need any modification. The “Rate of distraction events per mile" is not already normalized and hence is normalized using a Sigmoidal function. The "Percentage of distraction time per driving session" is between 0 and 100 and is normalized by dividing by 100.

At 32 each of the normalized parameters is multiplied by a weight that indicates how significant this parameter is in the overall result.

At 33 the size of a normal is calculated based on the normalized parameters as vectors. The result is divided by the maximum size of the vector, in order to keep the result between 0 and 1.

34 is the result, which indicate the deriving distraction score of a driving session.

Figure 3:
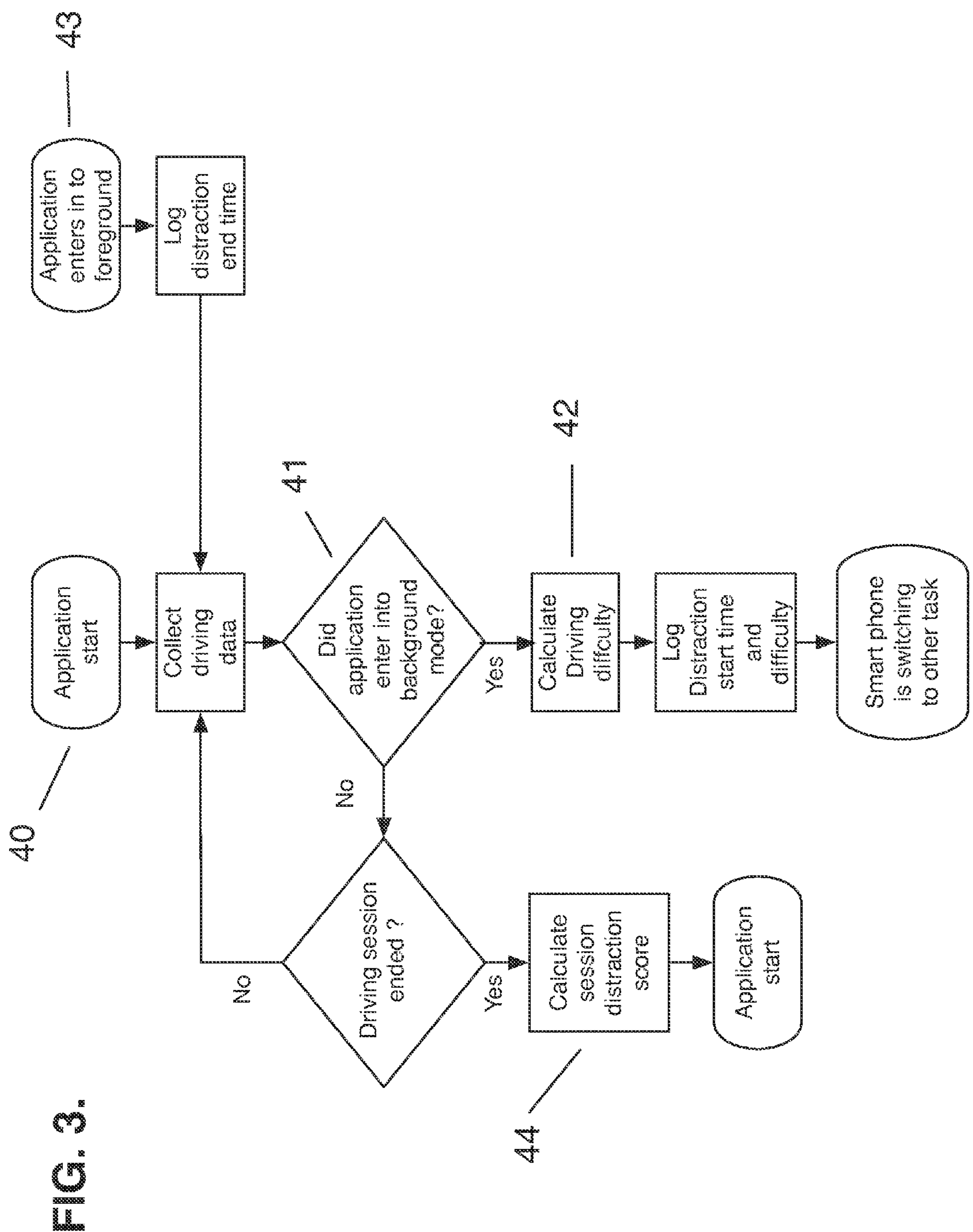
FIG. 3. Illustrates a flow diagram of an application, dedicated to monitor and calculate driving session distraction score.

FIG. 3. shows the flow of a Smartphone based application that is dedicated to monitor and calculate the driving session distraction score.

40 shows the application start. The operator can initiate this event at the beginning of the driving session or by detecting that a driving session was started while running in the background. Step A is followed by constant monitoring of the operational characteristics of the vehicle, by capturing data about speed, acceleration and yaw rate of the vehicle. Other types of data indicating the operation characteristics may also be used.

41 is testing if the application receives an event of the type "Application has switched to the background" from the operating system. This event indicates that a secondary application has now taken control and is in foreground, thus the user has directly or indirectly opted to use the Smartphone for other purposes. This is a leading indication of distraction as the driver has chosen to focus on activities other than driving.

If this is so we are at 42 where current driving difficulty is calculated in order to understand the severity of the distraction and this information is recorded by the application before the control is taken away by the operating system.

The application takes control back when the user is done with the activity related to secondary application as outlined in 43. After receiving an event suggesting that the application has switched to foreground, application records the current time as the end of distraction time.

44 is an indication that the driving session has ended. At this point we calculate the overall distraction score for this session.

The system and methods above has been described in general terms as an aid to understanding details of preferred embodiments of the present invention. In the description herein, numerous specific details are provided, such as examples of components and/or methods, to provide a thorough understanding of embodiments of the present invention. Some features and benefits of the present invention are realized in such modes and are not required in every case. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A portable electronic device-implemented method, comprising:

a) initiating a driving monitoring event on said portable electronic device associated with an operator of a controllably movable object, said portable electronic device including a stored program computing system executing instructions retrieved from a memory and including a user interface;

b) detecting association of said portable electronic device with said controllably moveable object;

c) collecting, using said portable electronic device, an accumulated time of an association of said portable electronic device with said controllably moveable object;

d) logging, using said portable electronic device, an accumulated time of one or more manual operation events of said portable electronic device that distract the operator during said association of said portable electronic device with said controllably moveable object; and e) establishing a distraction metric of said operator responsive to and based on said accumulated time of an association of said portable electronic device with said controllably moveable object and said accumulated time of one or more manual operation events of said portable electronic device during said association of said portable electronic device with said controllably moveable object.

2. The method of claim 1 wherein said logging step d) includes a detection of an operation of said user interface during said association of said portable electronic device with said controllably moveable object.

3. The method of claim 1 wherein said detecting step b) includes an automatic detection of an initiation of an operator-controlled movement session of said controllably moveable object by portable electronic device.

4. The method of claim 1 wherein said one or more manual operation events of said portable electronic device are selected from a plurality of different activities of said portable electronic device and wherein said logging step d) includes a logging of an accumulation of time for each activity of said plurality of different activities.

5. The method of claim 4 wherein said portable electronic device includes one or more environmental sensors, each sensor providing an environmental parameter and wherein each said manual operation event includes an associated value from at least one of said one or more environmental sensors at a time of said manual operation event.

6. The method of claim 5 wherein said logging step d) further determines for each said manual operation event, responsive to said one or more environmental parameters for said manual operation event, an operational difficulty for said controllably moveable object at said time of said manual operation event.

7. The method of claim 1 wherein said portable electronic device includes one or more environmental sensors, each sensor providing an environmental parameter and wherein each said manual operation event includes an associated value from at least one of said one or more environmental sensors at a time of said manual operation event.

8. The method of claim 7 wherein said logging step d) further determines for each said manual operation event, responsive to said one or more environmental parameters for said manual operation event, an operational difficulty for said controllably moveable object at said time of said manual operation event.

9. The method of claim 1 wherein said controllably movable object includes a manually-operable passenger vehicle.

10. An automated distraction measuring method, comprising:

a) establishing an association of a controllably movable motorized object with an operator associated with a portable electronic device, said portable electronic device including a computing system having a processing unit and a memory storing program instructions;

b) monitoring a status of said device during said association of said controllably movable motorized object with said operator to detect one or more driver distraction events, said monitoring step b) producing a set of parameters from said device, wherein the set of parameters comprise:

a duration and mileage of a driving session associated with the controllably movable motorized object, a duration of each driver distraction event of the operator associated with using said device during the duration of the driving session, and a driving difficulty value for the duration of each driver distraction event; and c) calculating a distraction metric for said operator responsive to said set of parameters.

11. The method of claim 10 wherein said controllably movable motorized object includes a manually-operable passenger vehicle.

12. The method of claim 11 wherein said set of parameters includes one or more vehicle performance metrics determined by said device.

13. The method of claim 10 wherein said controllably movable motorized object includes a manually-operable passenger vehicle and wherein said set of parameters includes one or more vehicle performance metrics determined by said device.

14. An apparatus, comprising:

a portable electronic device associated with an operator of a motorized vehicle, the portable electronic device comprising:

a memory that includes a stored program;

a user-interface that is configured to receive an input from the operator to initiate a driving monitoring event that determines a duration and a mileage of a driving session of the motorized vehicle; and a processor that is configured to execute the stored program responsive to receiving the input to initiate the driving monitoring event, wherein executing the stored program causes the processor to:

detect one or more driver distraction events of the operator associated with using the portable electronic device during the duration of the driving session;

determine and log a duration associated with each driver distraction event;

calculate a driving difficulty value for the duration of each driver distraction event based on operational characteristics of the motorized vehicle, wherein the driving difficulty is representative of a severity of the respective driver distraction event; and calculate a distraction score associated with the operator using the duration and the mileage of the driving session, the duration of each driver distraction event, and the driving difficulty value for the duration of each driver distraction event.

15. The apparatus of claim 14, wherein the processor detects one or more driver distraction events by monitoring and detecting a change in status of the portable electronic device.

16. The apparatus of claim 14, wherein the processor detects one or more driver distraction events by monitoring and detecting a switching between or switching to one or more applications from a current application running on the portable electronic device.

17. The apparatus of claim 14, wherein the processor detects one or more driver distraction events by monitoring and detecting an manual interaction of the operator with the portable electronic device.

18. The apparatus of claim 14, wherein the processor calculates a distraction score associated with the operator by calculating an average event distraction level by averaging the driving difficulty value for all the driver distraction events; calculating a rate of driver distraction events per mile of the motorized vehicle's driving session based on a number of the driver distraction events and the mileage of the driving session; and calculating a percentage of distraction time per driving session based on a total duration of all the driver distraction events and the duration of the driving session.

* * * * *